(12) United States Patent
Sakurai et al.

(10) Patent No.: US 6,455,963 B2
(45) Date of Patent: Sep. 24, 2002

(54) ELECTRIC MOTOR

(75) Inventors: Junichiro Sakurai; Masafumi Sakuma; Tetsuo Wakita; Yuki Tojima, all of Aichi-ken (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/740,014

(22) Filed: Dec. 20, 2000

(30) Foreign Application Priority Data

Dec. 20, 1999 (JP) .......................................... 11-361403

(51) Int. Cl.$^7$ .............................. H02K 5/00; H02K 9/00
(52) U.S. Cl. .............................. 310/89; 370/64; 370/57; 370/54
(58) Field of Search .............................. 310/52, 54, 57, 310/58, 59, 60 A, 64, 89, 87; 417/366, 423.7

(56) References Cited

U.S. PATENT DOCUMENTS 4,496,866 A * 1/1985 Yamamoto et al. ........... 310/87
4,531,357 A * 7/1985 Weber et al. ............... 60/39.07
4,908,538 A * 3/1990 Geberth, Jr. .................. 310/59
5,151,016 A * 9/1992 Her .............................. 417/32
5,440,186 A * 8/1995 Forsell et al. ............... 310/239
5,998,896 A * 12/1999 Early et al. .................... 310/89

FOREIGN PATENT DOCUMENTS

JP          11-69672          3/1999

* cited by examiner

Primary Examiner—Nestor Ramirez
Assistant Examiner—Dang Dinh Le
(74) Attorney, Agent, or Firm—Sughrue Mion, PLC

(57) ABSTRACT

A frame for an electric motor is provided with a high heat discharge efficiency at low manufacturing cost wherein a plurality of cooling media paths, grooves, groove paths, media paths and communication paths are formed on the frame using a diecast process. A plurality of fins are formed in the grooves and a plurality of cooling media guide members are secured about the periphery of the frame to control the flow of the cooling media.

7 Claims, 6 Drawing Sheets

ELECTRIC MOTOR

FIELD OF THE INVENTION

The present invention generally relates to an electric motor, and more. particularly, to an electric motor having cooling circuits which permit flow of cooling media in the motor housing.

BACKGROUND OF THE INVENTION

A known type of electrical motor device is disclosed in Japanese Patent Laid-Open Publication No. 11-69672 published on Mar. 9, 1999. The disclosed electric motor includes a frame. The frame is substantially composed of a cylindrical outer frame and a inner frame which supports a stator core and seal mechanism which is arranged at an outer peripheral edge portion. A groove is formed on the whole surface of the inner frame. A cooling path is defined between the inner surface of the outer frame and the outer surface of the inner frame. The leakage of the cooling media is prevented by using a seal mechanism.

In terms of low-cost, light weight and a high heat discharge efficiency, the frame is made by using a diecasting process. According to the Japanese Publication No. 11-69672, a high efficiency heat discharge can be obtained, however, a complicated cooling path structure is required. The complicated cooling path structure causes a relatively high manufacturing cost.

The object of the present invention is to produce a frame for an electric motor which has a high heat discharge efficiency with a low manufacturing cost.

SUMMARY OF THE INVENTION

To achieve the object of the present invention, an electric motor having a heat discharge structure comprises a frame having a cylindrical shaped bore which accommodates an electric coil and a stator core, the frame having a diecast block which having a rectangular shaped cross section, the diecast block having a plurality of grooves and paths which allows a flow of cooling media, the diecast block having a plurality of communication paths which are formed along with outer surface of the casting block and communicate between the grooves.

According to the invention, high heat discharge efficiency with low manufacturing cost can be achieved.

BRIEF DESCRIPTION OF THE DRAWINGS FIGURES

Additional features and characteristics of the present invention will become more apparent from the following detailed description considered with reference to the accompanying drawing figures in which like elements are designated by like reference numerals and wherein.

DETAILED DESCRIPTION OF THE PREFERRED EMBODIMENT

Figure 1:
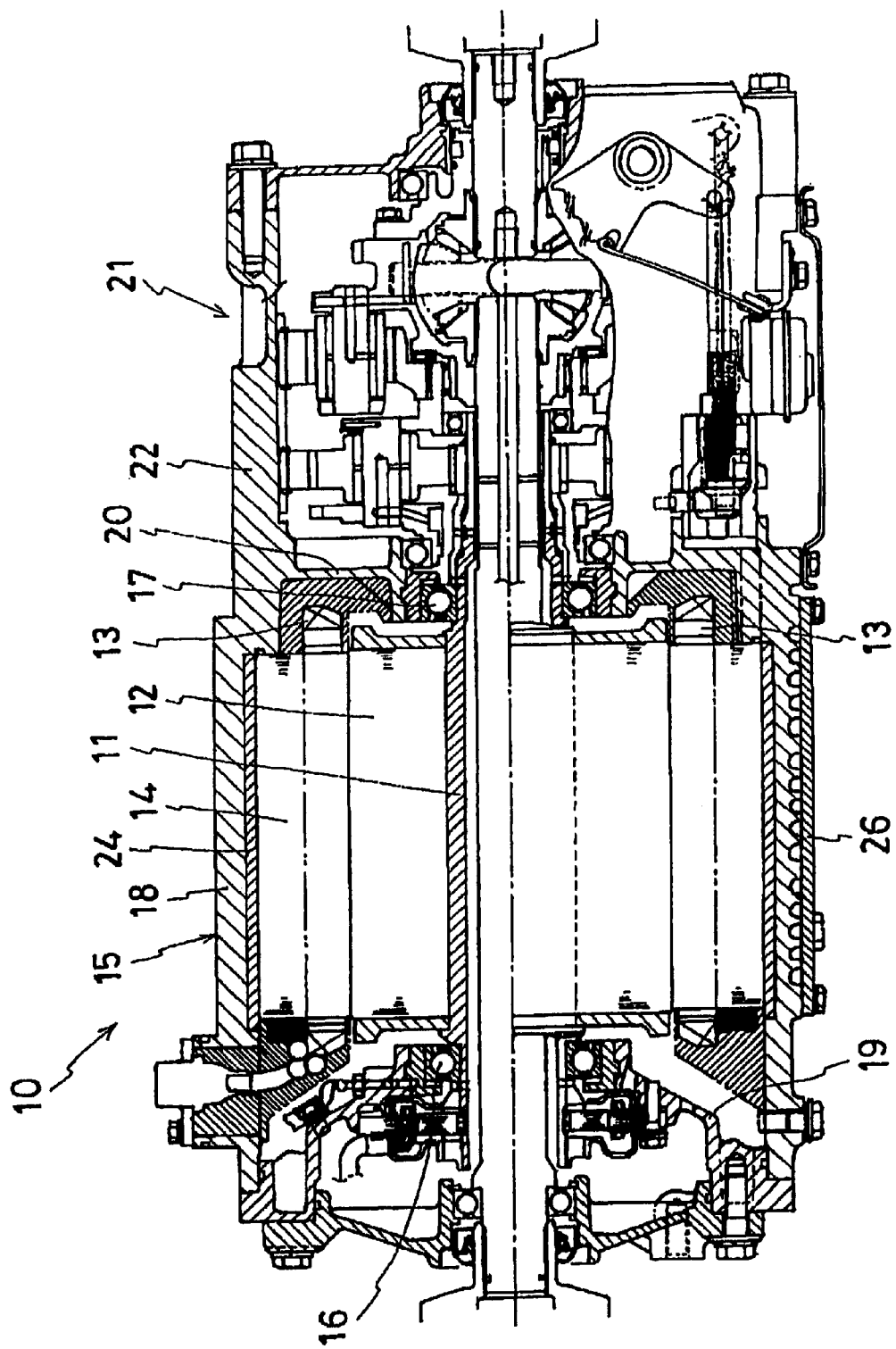
FIG. 1 shows a longitudinal sectional view of the electric motor according to the invention.

The invention will be described according to a preferred embodiment which is shown in attached drawings. FIG. 1 shows a longitudinal sectional view of the electric motor 10 in accordance with the present invention. The electric motor is used as a power source for a vehicle and is formed as a three-phase twin-salient-pole type switched reluctance motor. The electric motor 10 has a rotatable shaft 11, a rotor core 12, a stator core 14 and a frame 15. The rotor core 12 is secured on the shaft 11 and rotates altogether. The stator core 14 has an electric coil 13 and the frame 15 supports the stator core 14.

The shaft 11, which has a hollow pillar structure, is supported on the frame 15 by using ball bearing members 16 and 17 at opposite ends of the shaft 11. The rotor core 12 and the stator core 14 are formed by stacking up a plurality of soft magnetic steel plates.

The frame 15 has a block 18 which is diecast from aluminum material. At the one end of the cast block 18 (left side end in FIG. 1), a bracket 19 is attached to the cast block 18 and the bracket 19 supports one end of the shaft 11 by way of the bearing member 16. At the other end of the casting block 18 (right side end in FIG. 1), a bracket portion 20 and a reduction gear case 22 are integrally formed with the casting block 18. The bracket portion 22 of the cast block 18 supports the other end of the shaft 11 by way of the ball bearing member 17. A reduction gear unit 21 is disposed in the reduction gear case 22 and the shaft 11 is engaged with the reduction gear unit 21. The output from the reduction gear unit 21 is transmitted to the wheels.

Figure 2:
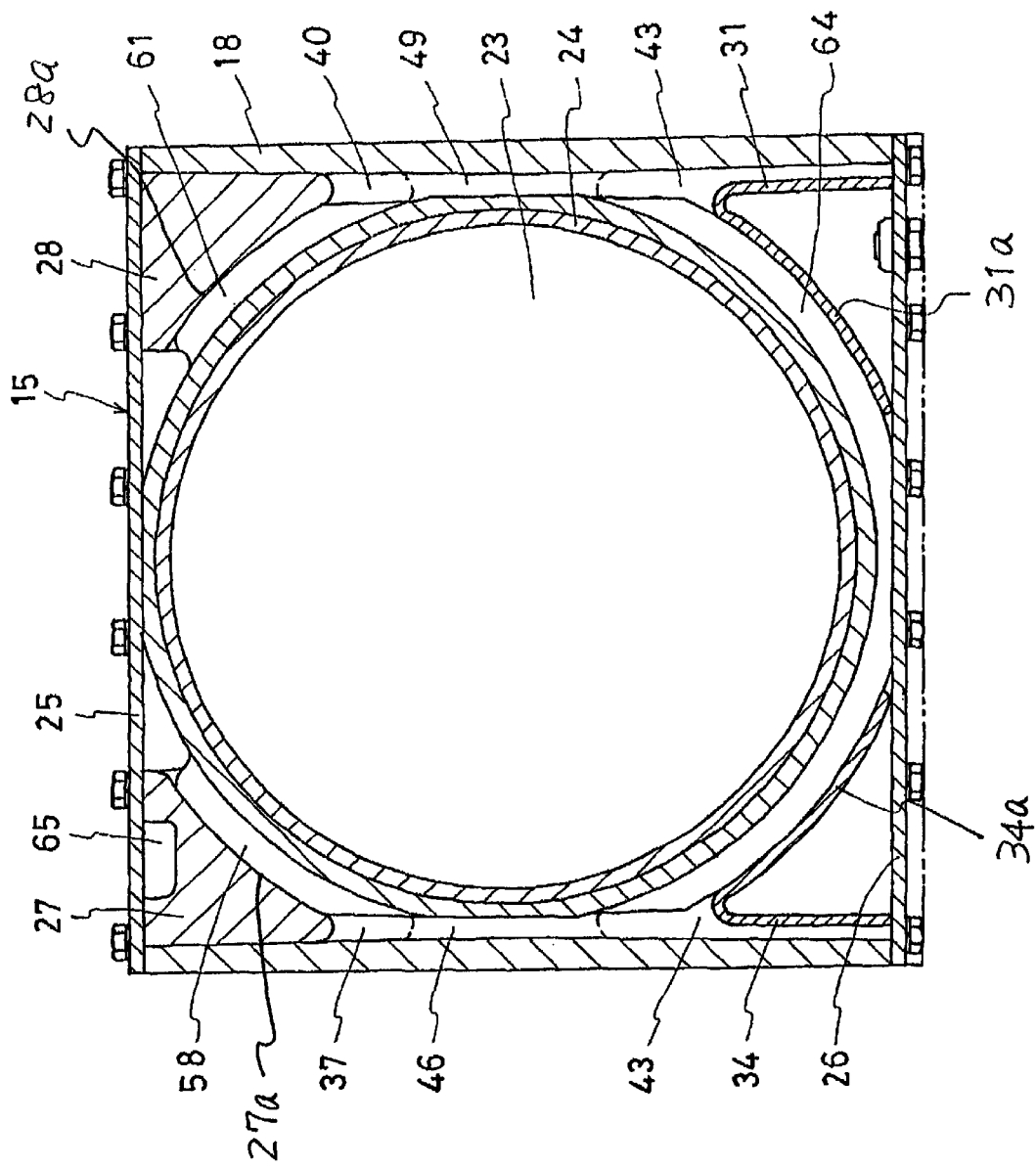
FIG. 2 shows a cross sectional view of the electric motor according to the invention.

FIG. 2 shows a cross sectional view of the electric motor 10. As shown in FIG. 2, the cross section of the cast block 18 is substantially rectangular, however the cast block 18 has a cylindrical shaped bore 23. The bore 23 is formed from a steel tube 24 and the tube 24 is diecast into the block 18. A regular machined steel tube is used as the tube 24. The stator core 14 is disposed in the tube 24 by a press-fitting connection.

Figure 3:
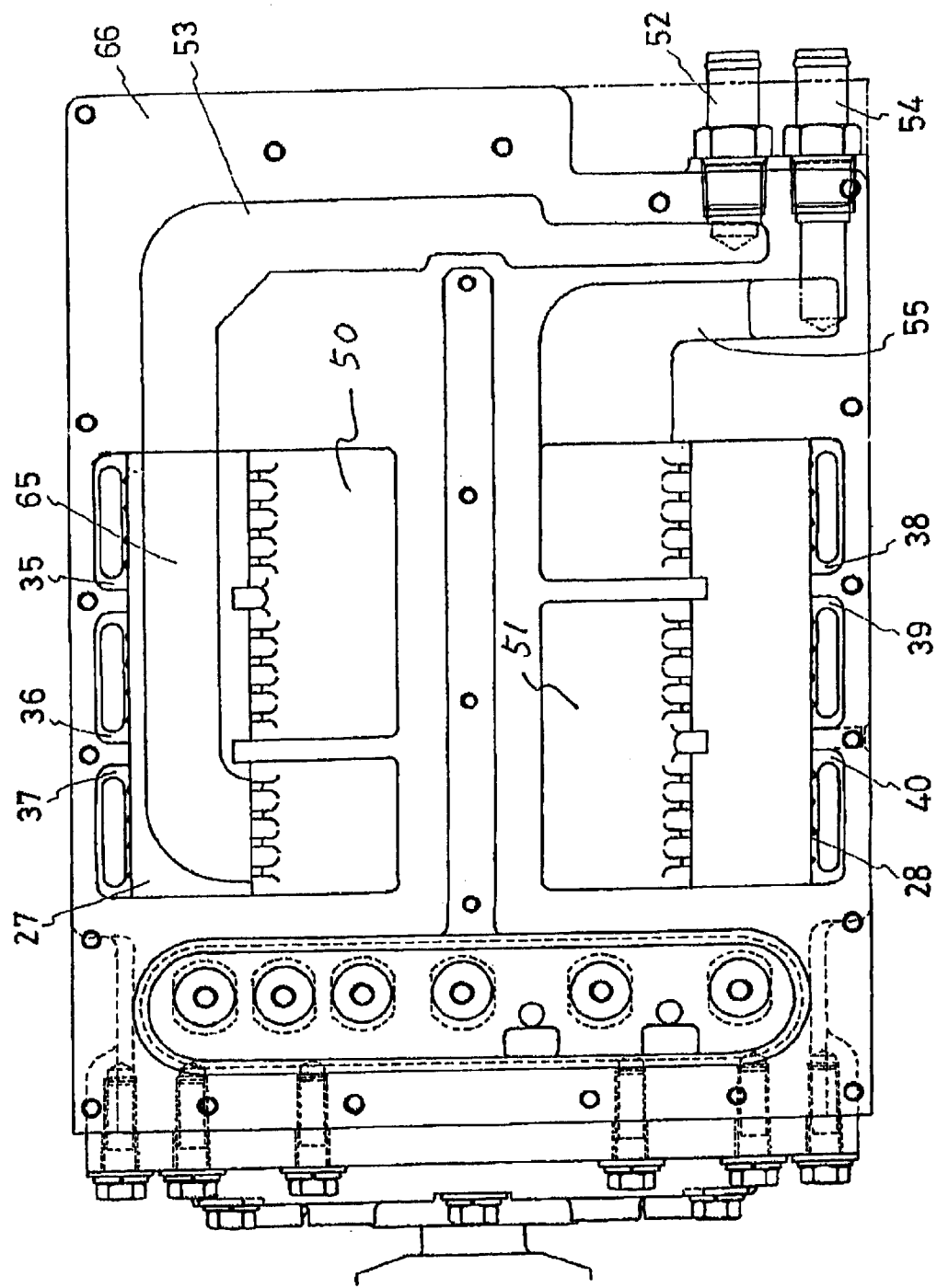
FIG. 3 shows a top view which excludes an upper cover.
Figure 4:
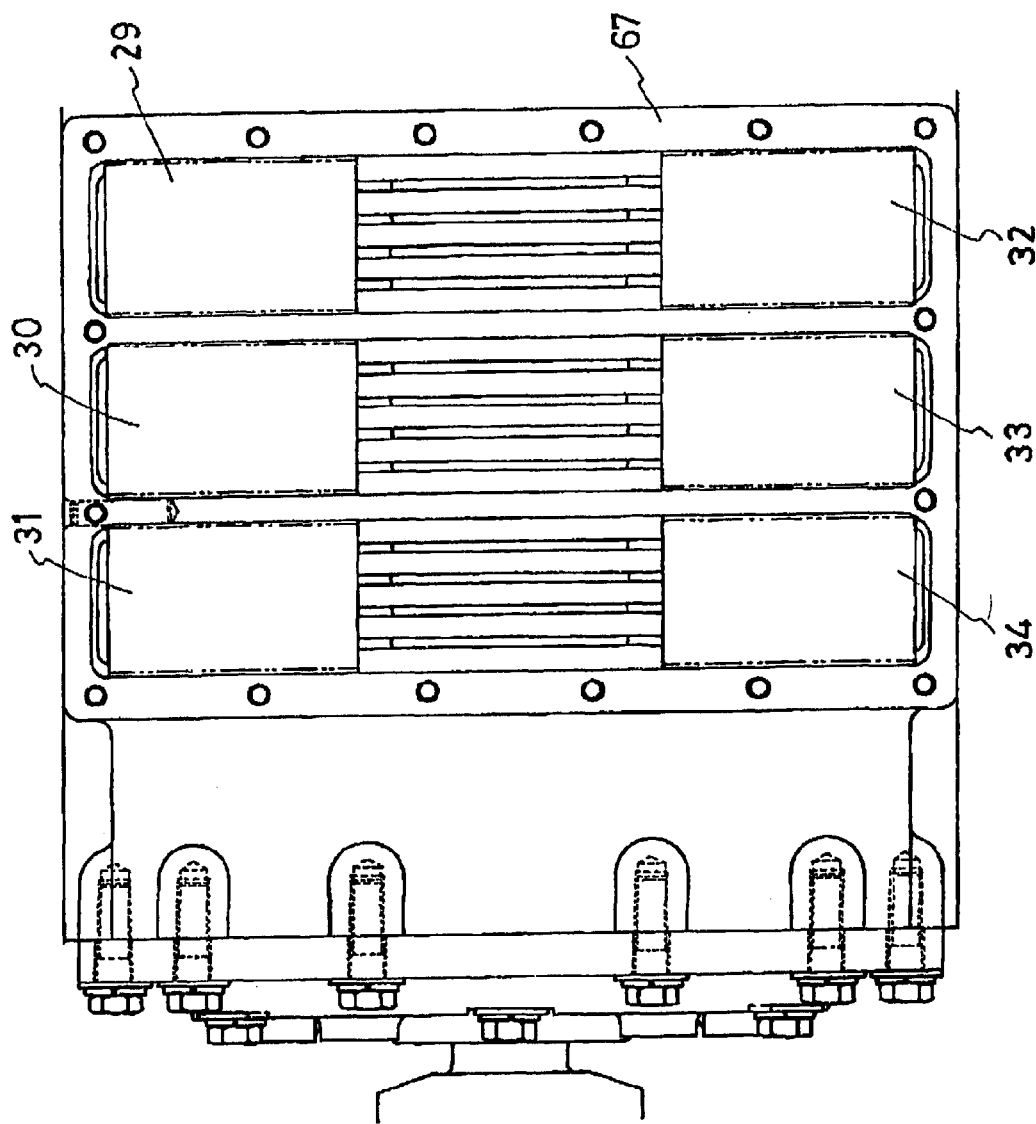
FIG. 4 shows a bottom view which excludes a lower cover
Figure 5:
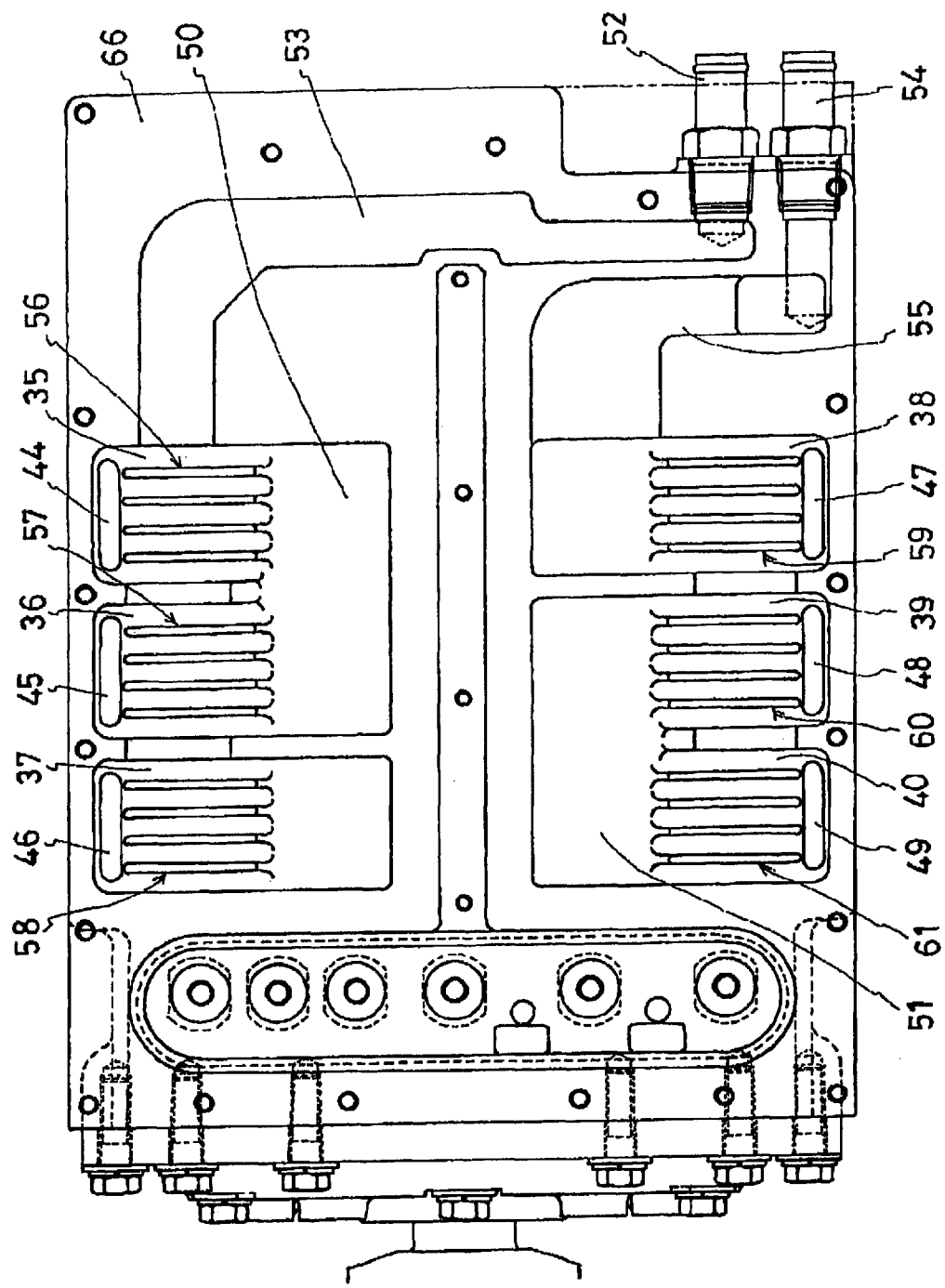
FIG. 5 shows a top view which excludes an upper cover and cooling media guide members.
Figure 6:
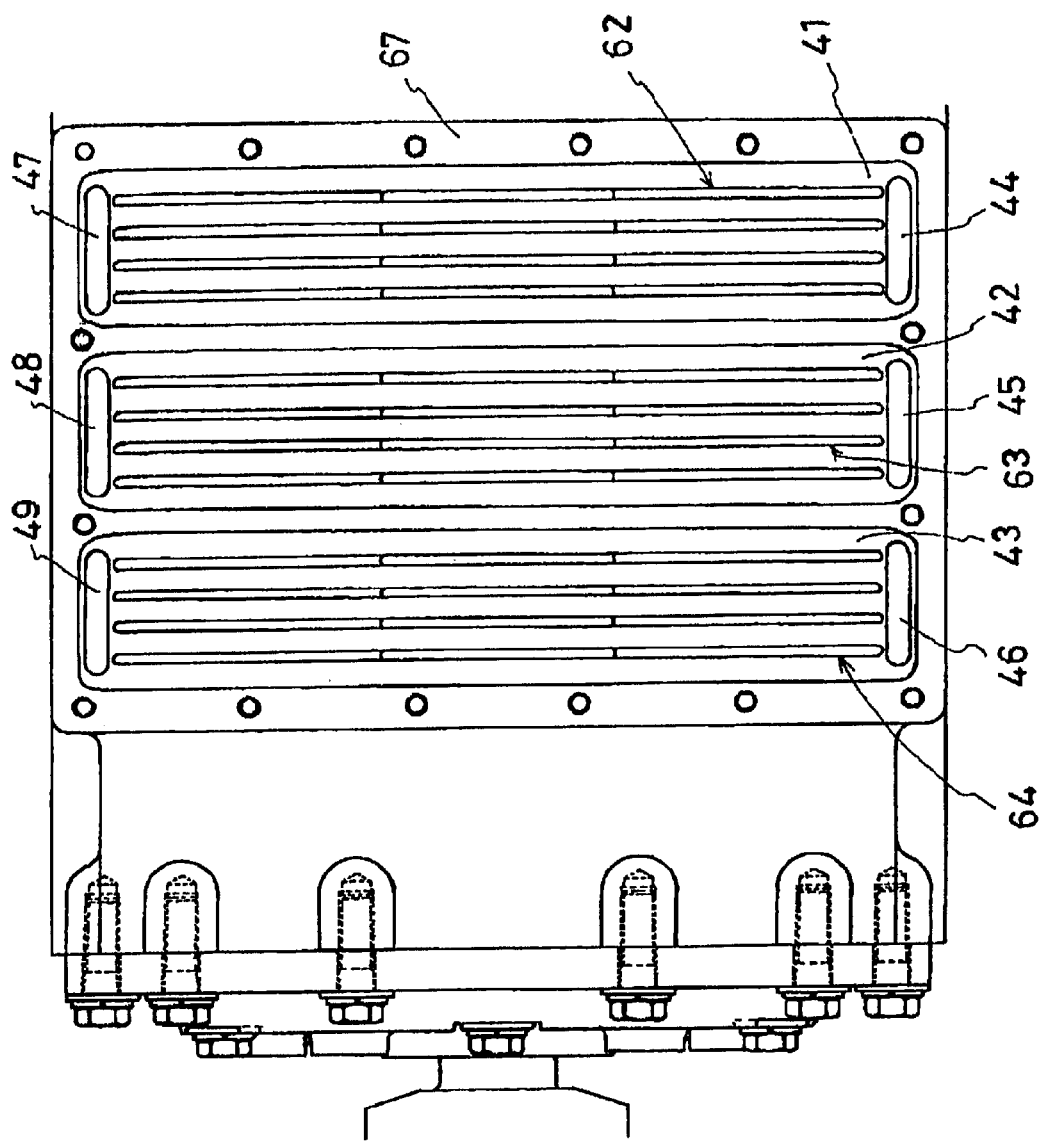
FIG. 6 shows a bottom view which excludes a lower cover and cooling media guide members.

FIG. 3 shows a top plan view of the electric motor 10 except for an upper cover 25. FIG. 4 shows a bottom plan view of the electric motor 10 except for a lower cover 26. FIG. 5 is similar to FIG. 3, however FIG. 5 excludes cooling media guide members 27 and 28 shown in FIG. 3. FIG. 6 is similar to FIG. 4, however FIG. 6 excludes cooling media guide members 29. 30, 31, 32, 33 and 34 shown in FIG. 4. The cast block 18 has a plurality of grooves 35, 36, 37, 38, 39, 40, 41, 42, and 43. The grooves 35, 36, 37, 38, 39 and 40 extend from an upper plane 66 to a lower plane 67. The grooves 41. 42, and 43 extend from the lower plane 67 to the upper plane 66. The grooves 35, 36, 37, 38, 39, 40, 41, 42, and 43 having substantially triangle shape. The grooves 35, 36, 37, 38, 39, 40, 41, 42, and 43 are formed when the block 18 is diecast.

The grooves 35 and 41 are connected through a communication path 44. The grooves 36 and 42 are connected through a communication path 45. The grooves 37 and 43 are connected through a communication path 46. The grooves 38 and 41 are connected through a communication path 47. The grooves 39 and 42 are connected through a communication path 48. The grooves 40 and 43 are connected through a communication path 49. These communication paths 44 to 49 are formed on an outer periphery of the tube 24.

The grooves 35 and 36 are communicated through a groove path 50 which is formed on the upper plane 66 of the casting block 18. The grooves 39 and 40 are communicated through a groove path 51 which is formed on the upper plane 66 of the casting block 18.

Cooling media paths 53, 55 are formed on the upper plane 66. The cooling media path 53 is connected to a cooling media inlet port 52. The cooling media path 55 is connected to a cooling media outlet port 54. The inlet and outlet ports 52, 54 are connected in a fluid tight manner to the cast block 18. The groove paths 50, 51 and the cooling media paths 53, 55 are formed during diecasting process of the cast block 18.

A plurality of fins 56, 57, 58, 59, 60 and 61 project upwardly from the bottom of the grooves 35, 36, 37, 38, 39 and 40. Similarly, a plurality of fins 62, 63 and 64 project downwardly from the bottom of the grooves 41, 42 and 43. The fins have a heat exchange function. In this embodiment, there are four fins in each groove and the fins are formed along the outer periphery of the tube 24. These fins are formed during the diecasting process of the block 18.

As shown in FIGS. 2 and 3, the cooling media guide member 27, which is secured to the upper cover 25, is disposed over the grooves 35, 36 and 37. The cooling media guide member 28, which is secured to the upper cover 25, is disposed over the grooves 38, 39 and 40. The cross section of the cooling media guide member 27 is substantially triangle. One plane, that has a cooling media path 65, faces toward the upper cover 25, the other plane faces toward the inner surface of the cast block 18 and another plane, which has an arc-shaped surface 27a, faces toward the fins 56, 57 and 58. A plurality of media paths are defined between the cooling media guide member 27 and the fins 56, 57 and 58. The cross section of the cooling media guide member 28 is also substantially triangle. One plane faces toward the upper cover 25, the other plane faces toward the inner surface of the casting block 18 and another plane, which has a n arc-shaped surface 28a, faces toward the fin s 59, 60 and 61. A plurality of media paths are defined between the cooling media guide member 28 and the fins 59,60 and 61.

As clearly shown in FIGS. 2 and 3, the cooling media path 65 communicates between the media path 53 and the groove 37. In this embodiment, the cooling media guide members 27, 28 are made of cast aluminum material. However, the cooling media guide members 27, 28 can be made of resin material instead.

As shown in FIG. 4, the cooling media guide members 29, 30, 31, 32, 33 and 34 are disposed over the grooves 41, 42, and 43, respectively. In this embodiment, the cooling media guide members 29, 30, 31, 32, 33 and 34 are produced by a mechanical pressing process using steel plates. However, as with the cooling media guide members 27 and 28, the cooling media guide members 29, 30, 31, 32, 33 and 34 can be made of resin material instead. The cross sections of the cooling media guide members 29, 30, 31, 32, 33 and 34 are substantially triangle. Arc-shaped surfaces 31 a and 34a as shown in FIG. 2 face toward the fins 62, 63 and 64. A plurality of media paths are defined between the cooling media guide members 29, 30, 31, 32, 33 and 34 and the fins 62, 63 and 64.

The upper cover 25 and the lower cover 26 are made of conventional steel plates and these covers 25 and 26 are secured to the cast block 18 by a plurality of bolts. Some electric motor control devices (e.g. an inverter etc. ) are disposed on the upper cover 25.

A cooling media (e.g. water) is supplied to the inlet port 52 from a pump (not shown). The cooling media flows from the inlet port 52 to the outlet port 53 by way of 53, 65, 37, 46, 43, 49, 40, 51, 39, 48, 42, 45, 36, 50, 35, 44, 41, 47, 38, and 55. The cooling media outlet port 54 is connected to a reservoir tank. The generated heat from the electric coil 13 is transmitted to the cast block 18 by way of the stator core 14 and the tube 24. The generated heat, that is transmitted to the cast block 18, is released to the cooling media which flows in the plurality of cooling media paths, grooves, groove path, media paths and communication paths. The cooling media flows almost over the whole outer surface of the stator core 14 and the fins 56 to 64 accelerate heat discharge to the cooling media. These cooling media paths (53, 55 and 65). grooves (35, 36, 37, 38, 39, 40, 41, 42, and 43), groove paths (50 and 51), media paths and communication paths (44,45, 46, 47, 48, and 49) are formed by a diecasting process by using an upper casting mold and a lower casting mold. The diecasting process is useful if the reduction case 22 is integrally formed with the cast block 18. According to above mentioned present embodiment, the upper cover 25, the lower cover 26 and the cooling media guide members 27 to 34 can be manufactured with a relatively low cost.

According to the present invention, the cooling media paths, grooves, groove paths, media paths and communication paths are formed around the heat source. These paths and grooves provide a high heat discharge efficiency. Further, the cooling media paths, grooves, groove paths, media paths and communication paths are formed using the diecasting process along with the cast block so as to reduce manufacturing costs.

What is claimed is:

1. An electric motor having a heat discharge structure on a frame, having a cylindrical shaped bore for accommodating an electric coil and a stator coil, wherein the frame is comprised of a diecast block having a rectangular shaped cross section, wherein the diecast block has a plurality of grooves which allow for flow of a cooling media which are formed on one of a pair of opposite outer surfaces of the diecast block so as to be perpendicular to a plane including a central axis of the cylindrical shaped bore, wherein the diecast block has a plurality of communication paths which are formed along with another pair of outer surfaces of the diecast block so as to be perpendicular to the grooves for communicating between each of the grooves formed on the different outer surfaces of the diecast block, and wherein each of the grooves formed on the same surface of the diecast block are communicated with each other by way of groove paths formed perpendicularly with respect to the grooves.

2. An electric motor as set forth in claim 1, wherein the plurality of grooves which are arranged in serial are communicated with each other by way of a groove path.

3. An electric motor as set forth in claim 1, wherein a plurality of cooling media guide members are disposed over the grooves and define media paths between the cooling media guide members and the diecast block.

4. An electric motor as set forth in claim 3, wherein the cooling media guide member has an arc-shaped surface which faces the fins and defines the media paths.

5. An electric motor as set forth in claim 1, wherein a plurality of fins are formed at bottoms of the grooves with the fins surrounding the stator core.

6. An electric motor as set forth in claim 1, wherein a reduction gear case is integrally formed with the diecast block.

7. An electric motor as set forth in claim 1, wherein a tube is molded into the diecast block to define the cylindrical bore.

* * * * *